US012094634B2

(12) United States Patent
Kuo et al.

(10) Patent No.: US 12,094,634 B2
(45) Date of Patent: Sep. 17, 2024

(54) COUPLED MAGNETIC ELEMENT HAVING HIGH VOLTAGE RESISTANCE AND HIGH POWER DENSITY

(71) Applicant: ITG Electronics, Inc., New Taipei (TW)

(72) Inventors: Martin Kuo, New Taipei (TW); Nanhai Zhu, New Taipei (TW)

(73) Assignee: ITG Electronics, Inc., New Taipei (TW)

( * ) Notice: Subject to any disclaimer, the term of this patent is extended or adjusted under 35 U.S.C. 154(b) by 666 days.

(21) Appl. No.: 17/130,115

(22) Filed: Dec. 22, 2020

(65) Prior Publication Data

US 2022/0199312 A1 Jun. 23, 2022

(51) Int. Cl.

*H01F 27/255* (2006.01)
*H01F 3/14* (2006.01)
*H01F 27/32* (2006.01)
*H01F 3/10* (2006.01)

(52) U.S. Cl.

CPC ............. *H01F 27/255* (2013.01); *H01F 3/14* (2013.01); *H01F 27/324* (2013.01); *H01F 2003/106* (2013.01)

(58) Field of Classification Search

CPC ........ H01F 27/255; H01F 3/14; H01F 27/324; H01F 2003/106; H01F 27/2852; H01F 17/04; H01F 27/284; H01F 27/263; H01F 27/306; H01F 27/30; H01F 27/2847; H01F 27/2861

See application file for complete search history.

(56) References Cited

U.S. PATENT DOCUMENTS

2004/0113741 A1* 6/2004 Li ........................... H01F 37/00 336/212
2005/0012586 A1* 1/2005 Sutardja .................. H01F 37/00 336/200
2010/0176909 A1* 7/2010 Yasuda ................. H01F 27/006 336/233
2013/0099886 A1* 4/2013 Yan ....................... H01F 27/303 336/192
2015/0155092 A1* 6/2015 Murtagian ............ H01F 27/292 336/192
2016/0012955 A1* 1/2016 Kuo .................... H01F 27/2847 336/212
2017/0011836 A1* 1/2017 Ma ........................ H01F 27/292
2018/0102210 A1* 4/2018 Knoll .................. H01F 27/2852
2018/0122562 A1* 5/2018 Ji ........................ H01F 27/2847

(Continued)

*Primary Examiner* — Shawki S Ismail
*Assistant Examiner* — Matthew T Sarles
(74) *Attorney, Agent, or Firm* — Li & Cai Intellectual Property (USA) Office

(57) ABSTRACT

Provided is a coupled magnetic element having high voltage resistance and high power density, which includes: a first magnetic core, a first coil, a second coil, and at least one second magnetic core. There is a plurality of gaps between the first magnetic core and the at least one second magnetic core, the first coil is located between the first magnetic core and the second coil, and the second coil is located between the first coil and the at least one second magnetic core. The coupled magnetic element having high voltage resistance and high power density provided herein can achieve a coupled magnetic effect with high voltage resistance and high power density by means of the foregoing technical solution.

10 Claims, 9 Drawing Sheets

(56) References Cited

U.S. PATENT DOCUMENTS

| | | | | |
|---|---|---|---|---|
| 2018/0301276 | A1* | 10/2018 | Yeh | H01F 27/292 |
| 2019/0180910 | A1* | 6/2019 | Kuo | H01F 37/00 |
| 2019/0214181 | A1* | 7/2019 | Wang | H01F 27/306 |
| 2019/0287708 | A1* | 9/2019 | Yeh | H01F 27/263 |
| 2019/0295765 | A1* | 9/2019 | Yan | H01F 27/306 |
| 2020/0118740 | A1* | 4/2020 | Banba | H01F 27/303 |
| 2020/0388431 | A1* | 12/2020 | Oki | H01F 27/292 |
| 2021/0020352 | A1* | 1/2021 | Okano | H01F 27/28 |
| 2021/0125775 | A1* | 4/2021 | Yan | H01F 27/263 |
| 2021/0257145 | A1* | 8/2021 | Wang | H01F 27/24 |
| 2021/0304956 | A1* | 9/2021 | Wang | H01F 27/2852 |
| 2021/0358676 | A1* | 11/2021 | Wang | H01F 27/341 |
| 2021/0358678 | A1* | 11/2021 | Wang | H01F 27/32 |
| 2022/0051846 | A1* | 2/2022 | Wang | H01F 27/266 |
| 2022/0199312 | A1* | 6/2022 | Kuo | H01F 27/255 |
| 2022/0285073 | A1* | 9/2022 | Yan | H01F 38/023 |
| 2022/0293336 | A1* | 9/2022 | Mikoshiba | H01F 1/15333 |
| 2022/0322539 | A1* | 10/2022 | Kuo | H01F 27/292 |
| 2022/0367107 | A1* | 11/2022 | Kuo | H01F 27/2847 |
| 2023/0100831 | A1* | 3/2023 | Yan | H01F 3/14<br>363/19 |
| 2023/0128201 | A1* | 4/2023 | Zhao | H01F 27/292<br>336/200 |

* cited by examiner

COUPLED MAGNETIC ELEMENT HAVING HIGH VOLTAGE RESISTANCE AND HIGH POWER DENSITY

FIELD OF THE DISCLOSURE

The present disclosure relates to a magnetic element, and more particularly to a coupled magnetic element having high voltage resistance and high power density.

BACKGROUND OF THE DISCLOSURE

Indispensable for electronic devices, power supply products always pursue an objective of size reduction to achieve high power density. If the power supply products employ an inductor with a relatively large size, the inductor is likely to occupy a relatively large space. Therefore, many designers focus their research on how to miniaturize the inductive element, and also spend a great deal of effort and time to get a more optimized solution.

The conventional inductive elements are basically discrete and are mainly single-piece structures, with the exception of a very small part enabling integration of multiple inductors in one piece. Some of the existing double-inductive elements are all formed by coupled double inductors simply with multiple coils in the same magnetic circuit. Moreover, in order to achieve high voltage resistance, the existing inductive elements are necessarily designed to be large or subjected to a complicated manufacturing process. That is to say, the inductive elements having high voltage resistance currently on the market have a problem of an excessively large size or a complicated manufacturing process.

SUMMARY OF THE DISCLOSURE

The technical problem to be solved by the present disclosure is to provide a coupled magnetic element having high voltage resistance and high power density, so as to overcome the shortcomings in the prior art. To solve the foregoing technical problem, one technical solution adopted by the present disclosure is to provide a coupled magnetic element having high voltage resistance and high power density, which includes a first magnetic core, a first coil, a second coil, and at least one second magnetic core. The first magnetic core has an accommodation space passing through a main body; the first coil is detachably disposed in the accommodation space and has a second accommodation space; the second coil is detachably disposed in the second accommodation space and has a third accommodation space; and the at least one second magnetic core is detachably disposed in the third accommodation space.

There is a plurality of gaps between the first magnetic core and the at least one second magnetic core, the first coil is located between the first magnetic core and the second coil, and the second coil is located between the first coil and the at least one second magnetic core. The assembly of the first magnetic core, the first coil, and the at least one second magnetic core forms a first inductor; the assembly of the first magnetic core, the second coil, and the at least one second magnetic core forms a second inductor; and the first inductor and the second inductor reach required inductance magnitude by virtue of an air gap formed by each gap.

One of the advantageous effects of the present disclosure lies in that the coupled magnetic element having high voltage resistance and high power density provided by the present disclosure can achieve a coupled magnetic effect with high voltage resistance and high power density by means of the foregoing technical solution.

To further understand the features and technical content of the present disclosure, reference is made to the following detailed description and drawings related to the present disclosure. However, the provided drawings are merely used for reference and description, and not intended to limit the present disclosure.

DETAILED DESCRIPTION OF THE EXEMPLARY EMBODIMENTS

Figure 1:
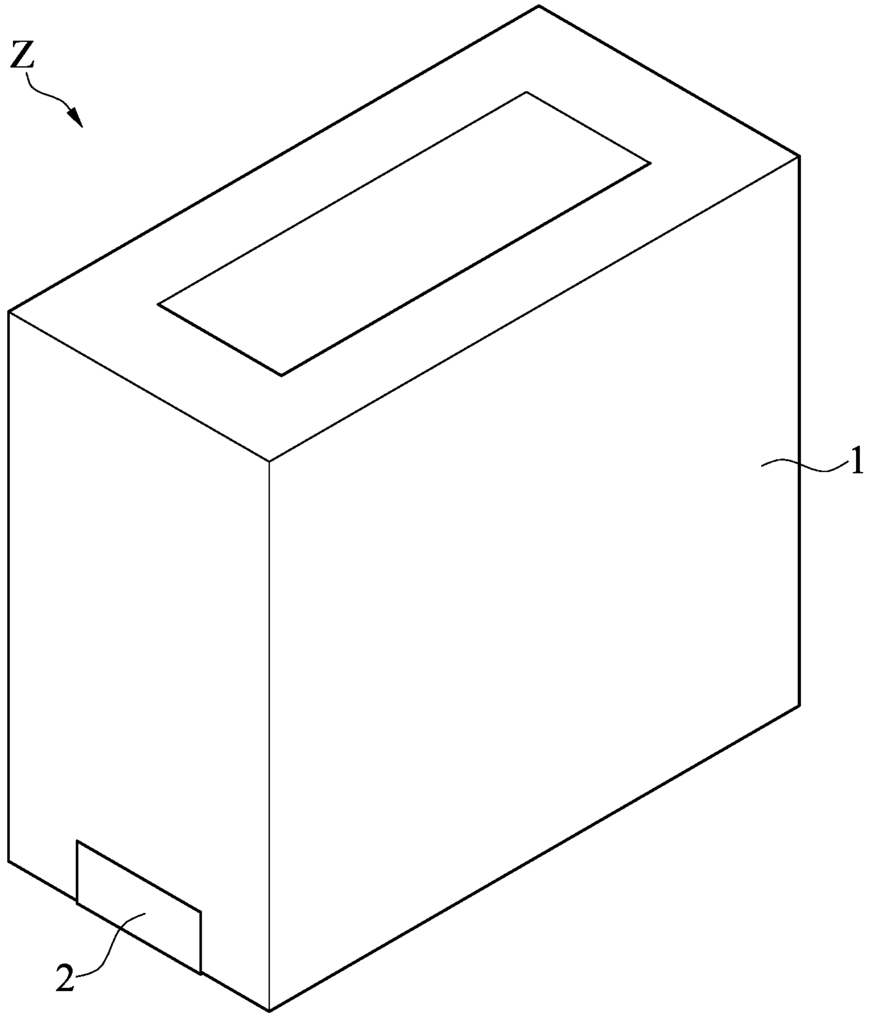
FIG. 1 is a schematic three-dimensional diagram of a coupled magnetic element having high voltage resistance and high power density in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The following describes implementations of the present disclosure relating to a "coupled magnetic element having high voltage resistance and high power density" through specific embodiments. Those skilled in the art can easily understand the advantages and effects of the present disclosure from the content disclosed in the specification. The present invention can be embodied or applied through other different embodiments. Based on different opinions and applications, the details in the present specification can also be modified and changed without departing from the concept of the present disclosure.

It should be understood that, although the terms "first", "second", "third", and the like are probably used herein to describe elements, these elements should not be limited by these terms. The use of these terms only aims to distinguish one element from another. In addition, the term "or" as used herein shall, according to the actual situation, include any one or a combination of more of the associated listed items.

First Embodiment

Refer to FIGS. 1 to 5, which are respectively a schematic three-dimensional diagram, a partial exploded diagram, a schematic exploded diagram, a schematic bottom view, and a schematic front view of a coupled magnetic element having high voltage resistance and high power density in a first embodiment of the present disclosure. As shown in the figures, the coupled magnetic element Z having high voltage resistance and high power density provided by the first embodiment of the present disclosure includes a first magnetic core 1, a first coil 2, a second coil 3, and at least one second magnetic core 4.

First, with reference to FIGS. 1 to 4, the first magnetic core 1 of the present disclosure has an accommodation space 10 passing through a main body, and may be made from ferrite or a soft magnetic material. This embodiment uses an example in which the first magnetic core 1 is a cuboid, but the present disclosure is not limited thereto. The accommodation space 10 is T-shaped, and the two sides of the first magnetic core 1 can be communicated through the accommodation space 10. Further, the first magnetic core 1 has a first inner wall 11, a second inner wall 12, a third inner wall 13, and a fourth inner wall 14 that correspond to the accommodation space 10. The first inner wall 11 and the second inner wall 12 are arranged opposite, and the third inner wall 13 and the fourth inner wall 14 are arranged opposite.

Figure 2:
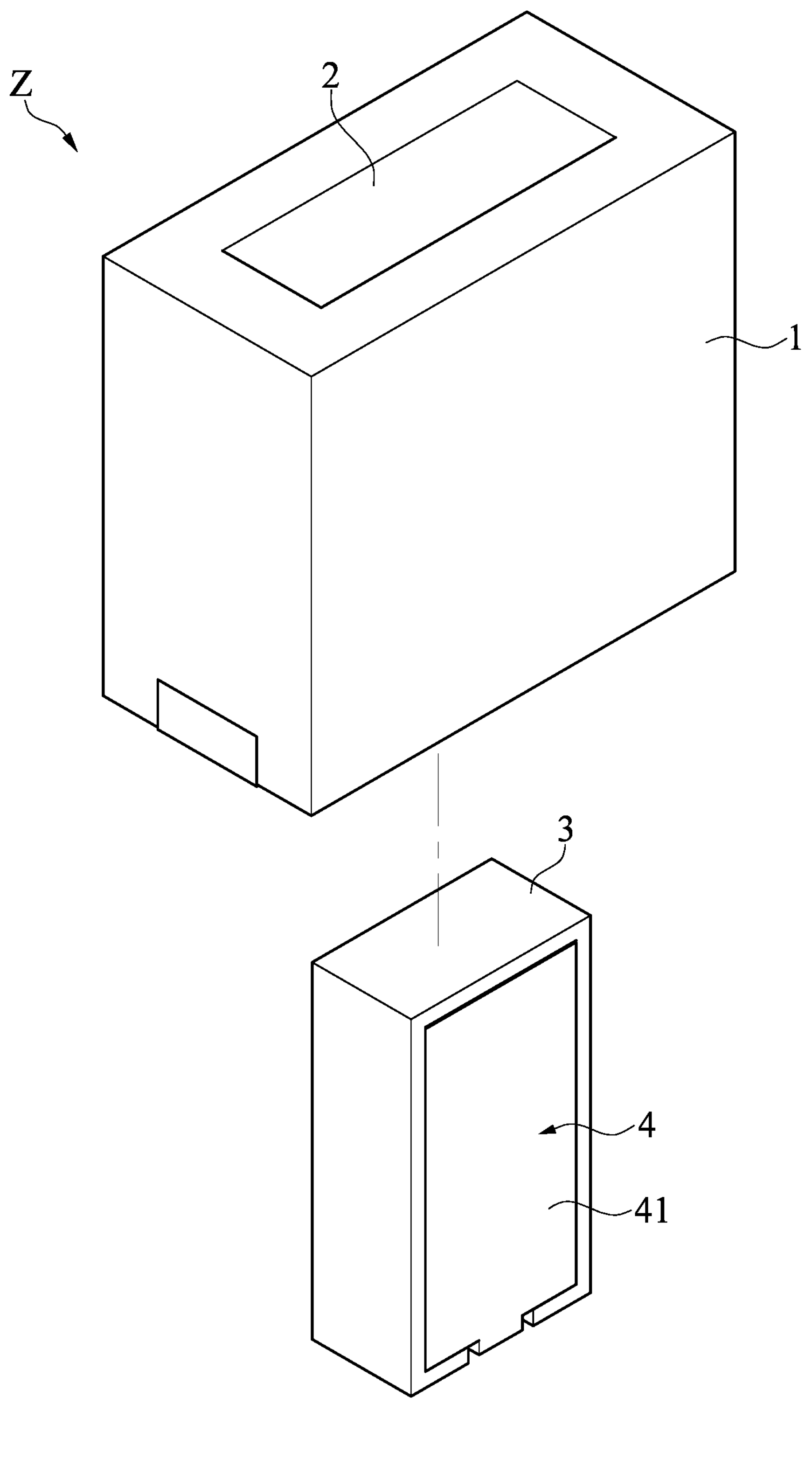
FIG. 2 is a partial exploded diagram of the coupled magnetic element having high voltage resistance and high power density in the first embodiment of the present disclosure.
Figure 3:
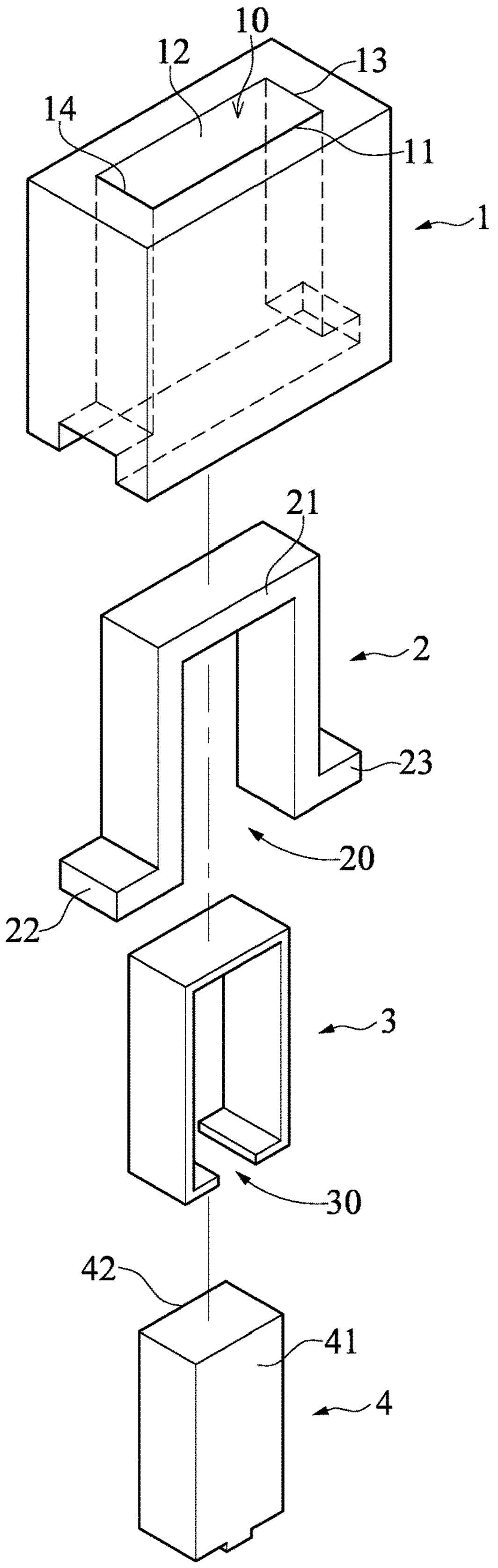
FIG. 3 is a schematic exploded diagram of the coupled magnetic element having high voltage resistance and high power density in the first embodiment of the present disclosure.

Then, with reference to FIGS. 1 to 4, the first coil 2 is detachably disposed in the accommodation space 10 of the first magnetic core 1, and has a second accommodation space 20. Further, the first coil 2 includes a main body portion 21, a first end portion 22, and a second end portion 23. The main body portion 21 is U-shaped and located in the accommodation space 10, with one end being perpendicularly connected to the first end portion 22 and the other end being perpendicularly connected to the second end portion 23. That is to say, the first coil 2 may be a-shaped, and the second accommodation space 20 of the first coil 2 is encircled by the main body portion 21. When the first coil 2 is disposed in the accommodation space 10, the first end portion 22 and the second end portion 23 may be completely located in the accommodation space 10 (as shown in FIGS. 1 and 2) or partially exposed out of the first magnetic core 1 (as shown in FIG. 5). Moreover, the first coil 2 may be a flat coil, but the present disclosure is not limited thereto. The first coil 2 may also be made from a stamped copper sheet or a conductive material of other types.

Figure 4:
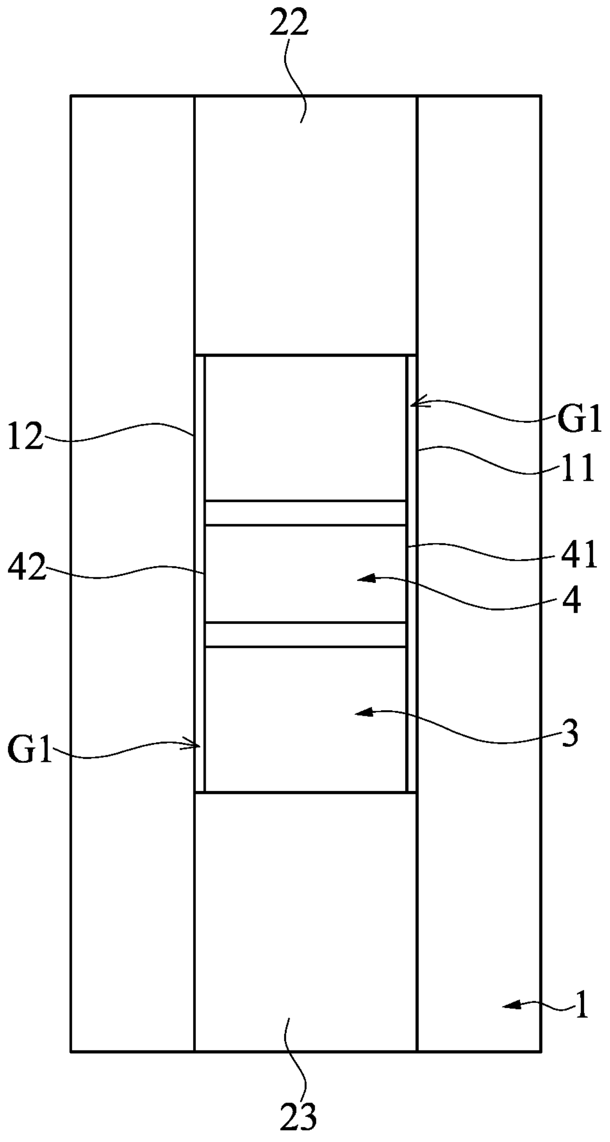
FIG. 4 is a schematic bottom view of the coupled magnetic element having high voltage resistance and high power density in the first embodiment of the present disclosure.
Figure 5:
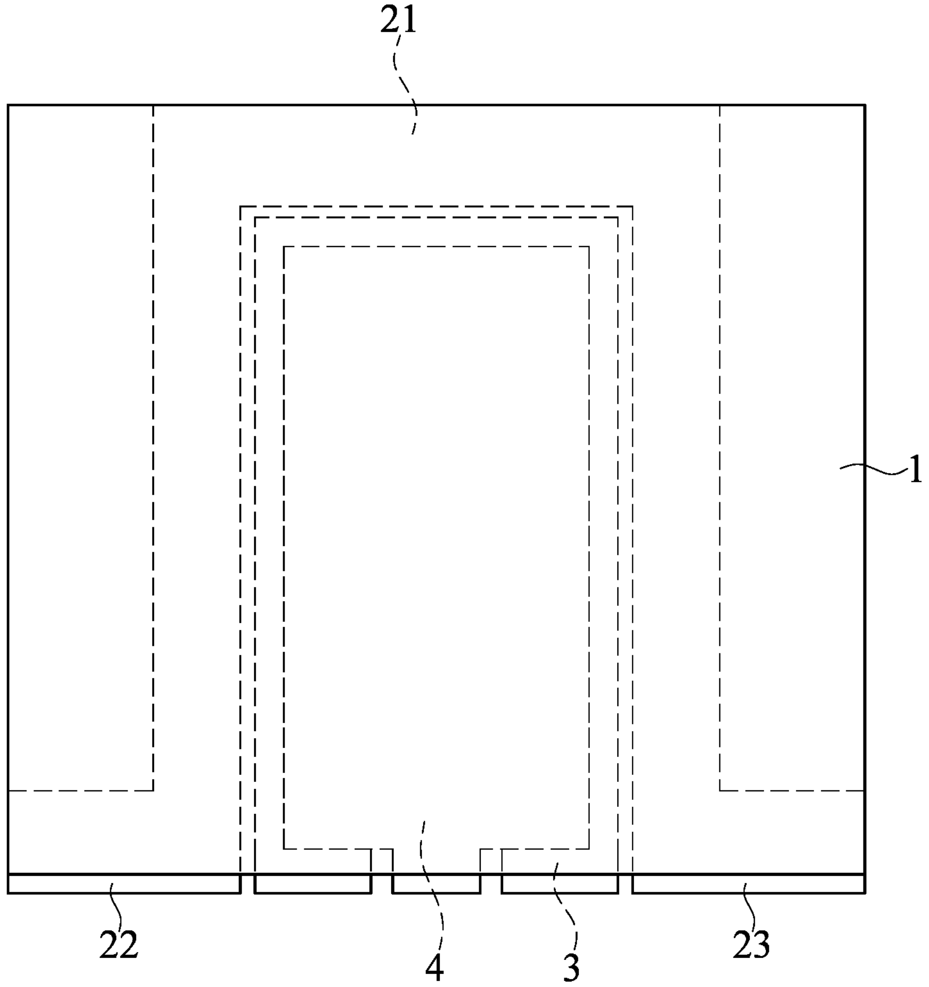
FIG. 5 is a schematic front view of the coupled magnetic element having high voltage resistance and high power density in the first embodiment of the present disclosure.

Afterwards, with reference to FIGS. 2 and 4, the second coil 3 is detachably disposed in the second accommodation space 20 of the first coil 2, that is, the second coil 3 can be partially encased in the first coil 2. The second coil 3 may be C-shaped, but the present disclosure is not limited thereto. The second coil 3 has a third accommodation space 30. The second coil 3 may be a flat coil, but the present disclosure is not limited thereto. The second coil 3 may also be made from a stamped copper sheet or a conductive material of other types.

Further with reference to FIGS. 2 and 4, the second magnetic core 4 is detachably disposed in the third accommodation space 30 of the second coil 3, and can be partially encased in the second coil 3. The second magnetic core 4 may be made from ferrite or a soft magnetic material. This embodiment uses an example in which the second magnetic core 4 is inverted T-shaped, but the present disclosure is not limited thereto. The shape of the second magnetic core 4 may be changed according to the shape of the second coil 3.

Further, with reference to FIGS. 1 to 4, the assembly of the first magnetic core 1, the first coil 2, and the second magnetic core 4 forms a first inductor; and the assembly of the first magnetic core 1, the second coil 3, and the second magnetic core 4 forms a second inductor. This embodiment uses an example in which there is one second magnetic core 4, but the present disclosure is not limited thereto. The second coil 3 and the second magnetic core 4 may be accommodated in the second accommodation space 20 of the first coil 2 (also accommodated in the accommodation space 10 of the first magnetic core 1). That is, the first coil 2 is located between the first magnetic core 1 and the second coil 3, and the second coil 3 is located between the first coil 2 and the second magnetic core 4. Because the accommodation space 10 of the first magnetic core 1 is larger than the second magnetic core 4, a first gap G1 may be formed between the first inner wall 11 of the first magnetic core 1 and a first surface 41 of the second magnetic core 4, and between the second inner wall 12 of the first magnetic core 1 and a second surface 42 of the second magnetic core 4. That is to say, there is a plurality of first gaps G1 between the first magnetic core 1 and the second magnetic core 4. The coupled magnetic element Z having high voltage resistance and high power density may accommodate gas (which is generally, for example, air, but the present disclosure is not limited thereto) in the plurality of first gaps G1, so as to form air gaps between the first magnetic core 1 and the second magnetic core 4. The third inner wall 13 and the fourth inner wall 14 of the first magnetic core 1 may directly contact the main body portion 21 of the first coil 2.

It should be noted that, in other preferred embodiments of the present disclosure, the first coil 2 may be in insulated connection or contact with the second coil 3. Alternatively, the coupled magnetic element Z having high voltage resistance and high power density in the present disclosure may also be formed by mutually insulated connection or contact of the first magnetic core 1, the first coil 2, the second coil 3, and the second magnetic core 4, thus realizing a magnetic element structure having ultra-high voltage resistance.

Therefore, the coupled magnetic element Z having high voltage resistance and high power density in the present disclosure is a whole device formed by assembling the first inductor composed of the first magnetic core 1, the first coil 2, and the second magnetic core 4 and the second inductor composed of the first magnetic core 1, the second coil 3, and the second magnetic core 4; and further enables the first inductor and the second inductor to have identical or different inductance magnitude by virtue of the air gaps formed by the plurality of first gaps G1. That is to say, in the coupled magnetic element Z having high voltage resistance and high power density in the present disclosure, the first magnetic core 1 and the second magnetic core 4 are spaced out and the spacing is used as the air gap, and a required inductance value is obtained based on different spacing distances. Thus, the first inductor and the second inductor may reach the required inductance magnitude via the air gaps formed by the plurality of first gaps G1.

It should be noted that, the size of each first gap G1 may be flexibly adjusted by the manufacturer or user according to actual requirements. That is to say, the air gaps between the first magnetic core 1 and the second magnetic core 4 may be controlled by changing the size of the first gaps G1, thus controlling the inductance magnitude of the first inductor and the second inductor.

To sum up, by means of the foregoing technical solution, the coupled magnetic element Z having high voltage resistance and high power density in the present disclosure can realize integration of two inductive elements, thus effectively reducing the number of elements or devices on a printed circuit board assembly (PCBA) used by the user; and further can minimize the whole size and save the space to the greatest extent, thus improving the power density of a power supply product, facilitating product miniaturization, and overcoming the shortcomings in the prior art.

Second Embodiment

Figure 6:
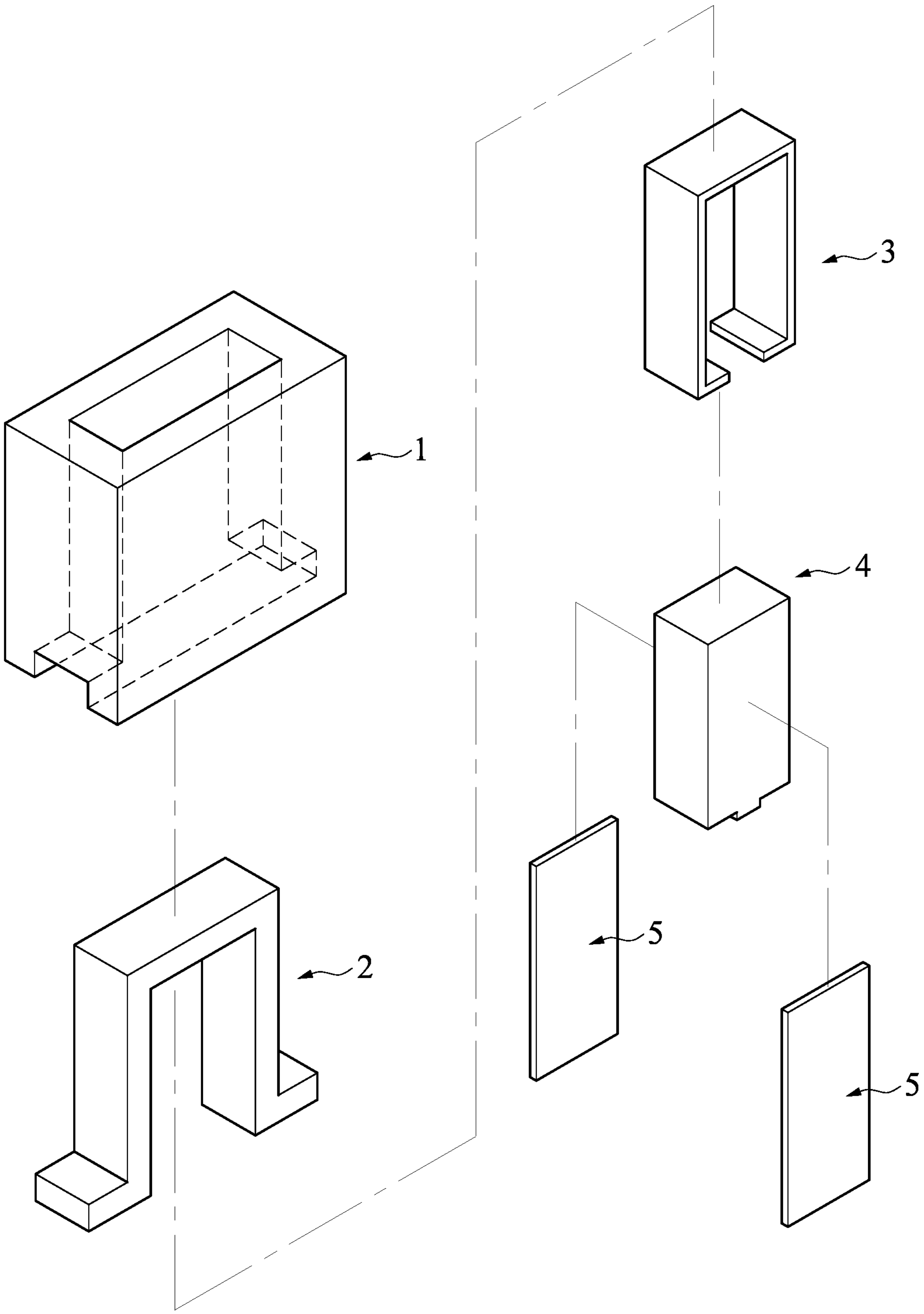
FIG. 6 is a schematic exploded diagram of a coupled magnetic element having high voltage resistance and high power density in a second embodiment of the present disclosure.

Refer to FIG. 6, which is a schematic exploded diagram of a coupled magnetic element having high voltage resistance and high power density in a second embodiment of the present disclosure, and refer to FIGS. 1 to 5 in combination. As shown in the FIG. 6, the coupled magnetic element Z having high voltage resistance and high power density in this embodiment is approximately similar to that in the first embodiment, so the details are not described herein again. This embodiment differs from the foregoing embodiment in that, the coupled magnetic element Z having high voltage resistance and high power density in this embodiment may further include a plurality of spacer units 5 and each spacer unit 5 is detachably disposed in a corresponding first gap G1. The first inductor and the second inductor control the air gaps between the first magnetic core 1 and the second magnetic core 4 by means of arrangement of each spacer unit 5, so as to reach the required inductance magnitude.

For example, with reference to FIGS. 4 and 6, in the coupled magnetic element Z having high voltage resistance and high power density in the present disclosure, the spacer units 5 may be respectively disposed in the first gaps G1 to server as air gaps in the first inductor and the second inductor. The spacer unit 5 may be a sheet-like body made from a non-ferromagnetic material which includes a mylar sheet, kraft paper sheet, plastic sheet, and glass sheet; or made by mixing different non-ferromagnetic materials. Therefore, the first inductor and the second inductor may control the air gaps between the first magnetic core 1 and the second magnetic core 4 by virtue of the plurality of spacer units 5, so as to reach the required inductance magnitude.

Third Embodiment

Figure 7:
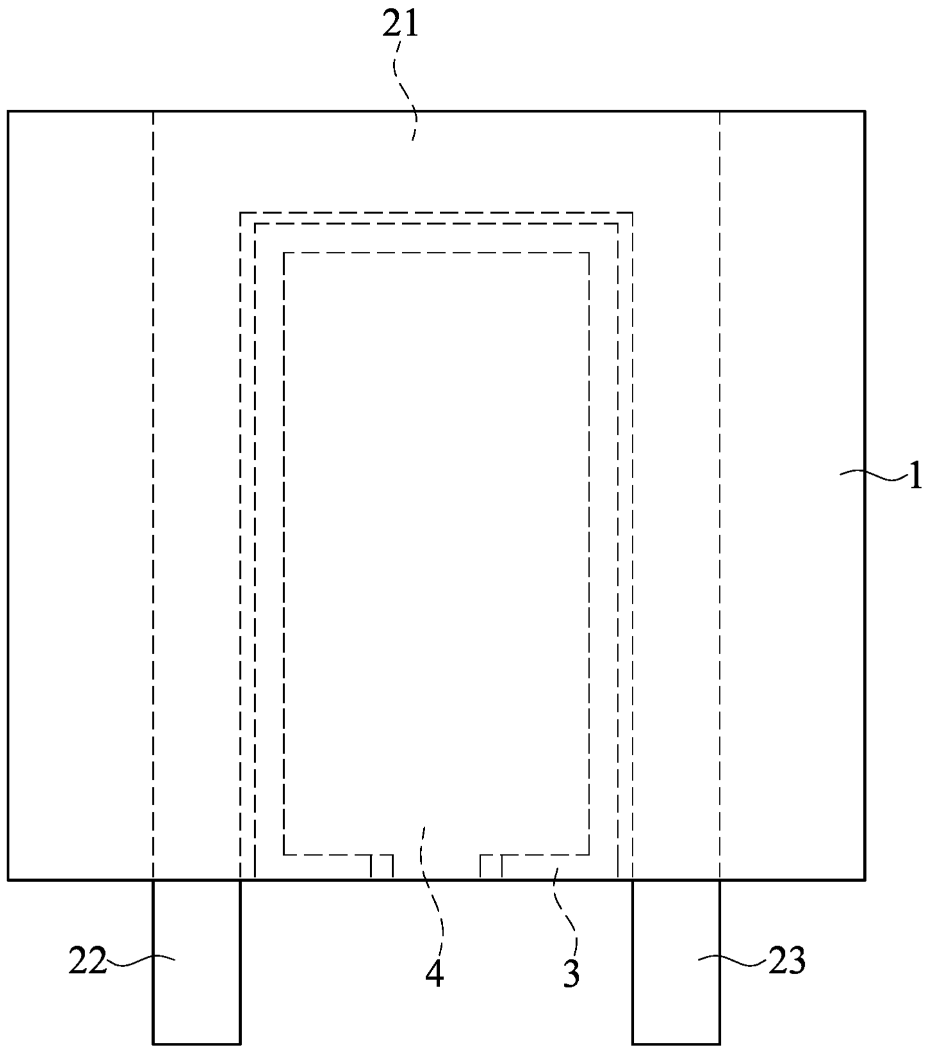
FIG. 7 is a schematic front view of a coupled magnetic element having high voltage resistance and high power density in a third embodiment of the present disclosure.

Refer to FIG. 7, which is a schematic front view of a coupled magnetic element having high voltage resistance and high power density in a third embodiment of the present disclosure, and refer to FIGS. 1 to 6 in combination. As shown in FIG. 7, the coupled magnetic element Z having high voltage resistance and high power density in this embodiment is approximately similar to that in the first embodiment, so the details are not described herein again. This embodiment differs from the foregoing embodiments in that, the accommodation space 10 in this embodiment may be cuboid-shaped and the first coil 2 may include a main body portion 21, a first end portion 22, and a second end portion 23, where the main body portion 21 is U-shaped and located in the accommodation space 10, with two ends being respectively connected to the first end portion 22 and the second end portion 23; and the first end portion 22 and the second end portion 23 are exposed out of the first magnetic core 1.

For example, with reference to FIG. 7, the first coil 2 may be U-shaped, and after assembly of the first coil 2 and the first magnetic core 1, the first end portion 22 and the second end portion 23 of the first coil 2 are exposed out of the first magnetic core 1 to serve as conductive pins. Therefore, when fitted to a base board (not shown in the figure), the coupled magnetic element Z having high voltage resistance and high power density of the present disclosure can be securely disposed on the base board by inserting the first end portion 22 and the second end portion 23 into the base board.

Fourth Embodiment

Figure 8:
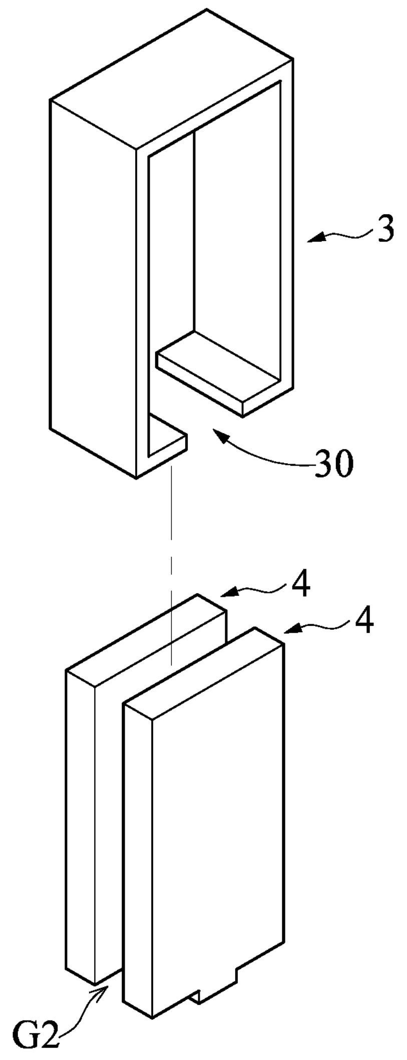
FIG. 8 is a partial exploded diagram of a coupled magnetic element having high voltage resistance and high power density in a fourth embodiment of the present disclosure.
Figure 9:
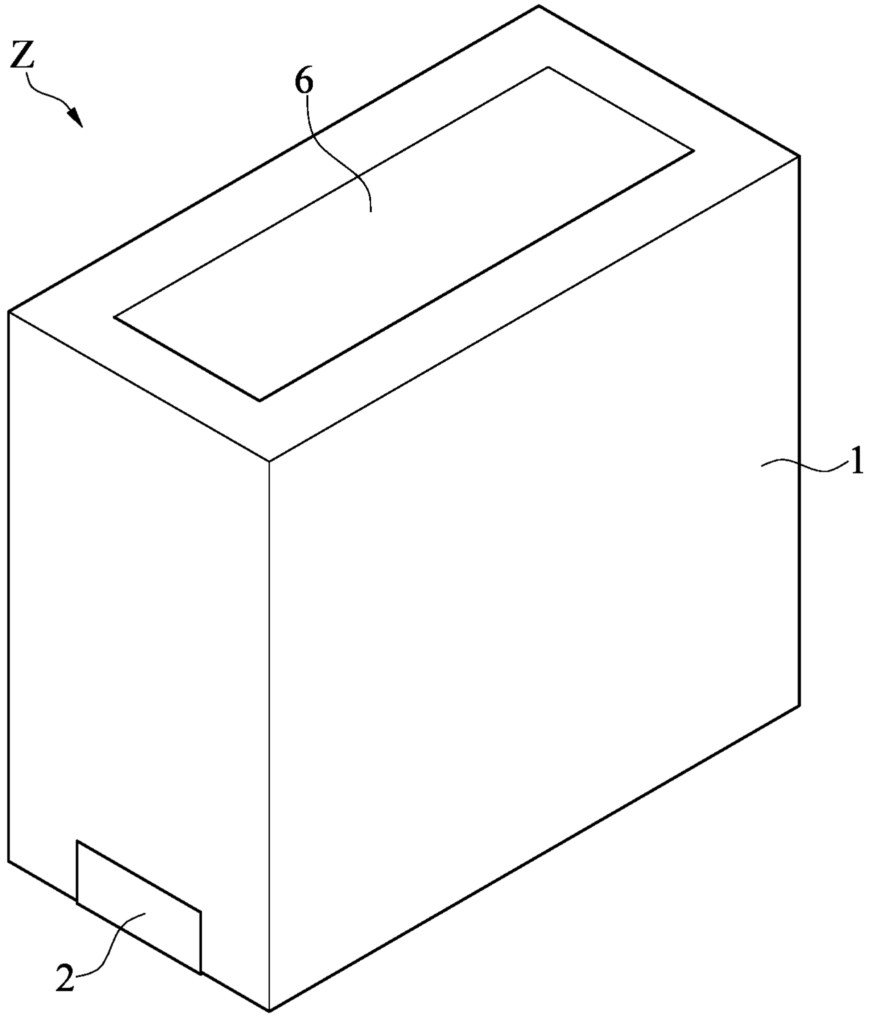
FIG. 9 is a schematic three-dimensional diagram of the coupled magnetic element having high voltage resistance and high power density in the fourth embodiment of the present disclosure.

Refer to FIGS. 8 and 9, which are a partial exploded diagram and a schematic three-dimensional diagram of a coupled magnetic element having high voltage resistance and high power density in a fourth embodiment of the present disclosure, and refer to FIGS. 1 to 7 in combination. As shown in FIGS. 8 and 9, the coupled magnetic element Z having high voltage resistance and high power density in this embodiment is approximately similar to that in the foregoing embodiments, so the details are not described herein again. This embodiment differs from the foregoing embodiments in that, there is a plurality of second magnetic cores 4 in this embodiment and there is a second gap G2 between two adjacent second magnetic cores 4. The second inductor reaches the required inductance magnitude by virtue of an air gap formed by the second gap G2.

For example, with reference to FIG. 8, a plurality of second magnetic cores 4 is disposed in the third accommodation space 30 of the second coil 3. This embodiment uses an example in which there are two second magnetic cores 4, but the present disclosure is not limited thereto. Moreover, a spacer unit 5 may also be disposed in the second gap G2 as the air gap (as descried in the second embodiment). Therefore, the second inductor can reach the required inductance magnitude by virtue of the air gap formed by the second gap G2 or the spacer unit 5 in the second gap G2.

In addition, with reference to FIG. 9, the coupled magnetic element Z having high voltage resistance and high power density in the present disclosure may be further disposed with a cover unit 6 on the top of the first magnetic core 1, which may be a plate piece for the manufacturer or user to print characters or digits.

However, the examples given in the foregoing embodiments are only for describing one of feasible embodiments, and are not intended to limit the present disclosure.

Advantageous Effects of the Embodiments

One of the advantageous effects of the present disclosure lies in that the coupled magnetic element Z having high voltage resistance and high power density provided by the present disclosure can achieve a coupled magnetic effect with high voltage resistance and high power density by means of the foregoing technical solution.

Further, by means of the foregoing technical solution, the present disclosure realizes a coupled magnetic element Z having high voltage resistance and high power density. By means of a reasonable design of a magnetic circuit, the coupled magnetic element Z having high voltage resistance and high power density in the present disclosure enables two inductors to have a high coupling coefficient and have mutual impact on each other. In addition, by using a first coil 2 and a second coil 3 coated with insulating paint or an insulating film, in combination with the design of a plurality of air gaps between the first magnetic core 1 and the second magnetic core 4, the coupled magnetic element Z having high voltage resistance and high power density in the present disclosure achieves a high voltage resistance effect. Moreover, the second inductor can be accommodated inside the first magnetic core 1, thus minimizing the size and saving the space of the whole element, and further improving the power density. That is to say, by the structural design of the coupled magnetic element having high voltage resistance and high power density, the present disclosure can overcome the technical bottleneck of high voltage resistance and high power density magnetic elements in the existing market, and further effectively reduce the whole manufacturing cost while simplifying the structure and composition of the coupled magnetic element, thus being highly competitive in both technology and cost.

Further, by arrangement of the first gaps G1 and by using the air gaps formed by accommodating air in the first gaps G1 or disposing spacer units 5 therein, the first inductor composed of the first magnetic core 1, the first coil 2, and at least one second magnetic core 4 and the second inductor composed of the first magnetic core 1, the second coil 3, and the second magnetic core 4 can control the air gaps between the first magnetic core 1 and the second magnetic core 4, so as to reach the required inductance magnitude and further to realize the non-coupled double inductors. Therefore, the coupled magnetic element Z having high voltage resistance and high power density in the present disclosure can realize integration of two inductive elements, thus effectively reducing the number of elements or devices on a PCBA used by the user; and further can minimize the whole size and save the space to the greatest extent, thus improving the power density of a power supply product, facilitating product miniaturization, and overcoming the shortcomings in the prior art.

The above disclosed content merely describes preferred and feasible embodiments of the present disclosure, and is not intended to limit the scope of patent application of the present disclosure. Therefore, any equivalent technical changes made according to the description and content of the drawings of the present disclosure all fall within the scope of the patent application of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A coupled magnetic element having high voltage resistance and high power density, comprising:

a first magnetic core, integrally formed and having a first inner wall, a second inner wall, a third inner wall, a fourth inner wall and an accommodation space passing through a main body of the first magnetic core, wherein the accommodation space is surrounded by the first inner wall, the second inner wall, the third inner wall and the fourth inner wall, wherein the first inner wall and the second inner wall are arranged opposite to each other, and the third inner wall and the fourth inner wall are arranged opposite to each other; the first inner wall and the second inner wall are correspondingly perpendicular to the third inner wall, and the first inner wall and the second inner wall are correspondingly perpendicular to the fourth inner wall;

a first coil, detachably disposed in the accommodation space and having a second accommodation space;

a second coil, detachably disposed in the second accommodation space and having a third accommodation space; and at least one second magnetic core, detachably disposed in the third accommodation space, and a total volume of the second magnetic core being smaller than a total volume of the third accommodation space;

wherein there is a plurality of first gaps between the first magnetic core and the at least one second magnetic core, the first coil is located between the first magnetic core and the second coil, and the second coil is located between the first coil and the at least one second magnetic core; and the assembly of the first magnetic core, the first coil, and the at least one second magnetic core forms a first inductor; the assembly of the first magnetic core, the second coil, and the at least one second magnetic core forms a second inductor; and the first inductor and the second inductor reach required inductance magnitude by virtue of an air gap formed by each first gap.

2. The coupled magnetic element having high voltage resistance and high power density of claim 1, wherein; the first gap is formed between the first inner wall and a first surface of the at least one second magnetic core, and between the second inner wall and a second surface of the at least one second magnetic core; and the third inner wall and the fourth inner wall directly contact two pins of the first coil respectively.

3. The coupled magnetic element having high voltage resistance and high power density of claim 1, wherein the accommodation space is T-shaped, and two sides of the first magnetic core are communicated through the accommodation space; the first coil comprises a main body portion, a first end portion, and a second end portion; the main body portion is U-shaped and located in the accommodation space, with one end being perpendicularly connected to the first end portion and the other end being perpendicularly connected to the second end portion; and the first end portion and the second end portion are completely located in the accommodation space or partially exposed out of the first magnetic core.

4. The coupled magnetic element having high voltage resistance and high power density of claim 1, wherein the accommodation space is cuboid-shaped and the first coil comprises a main body portion, a first end portion, and a second end portion; the main body portion is U-shaped and located in the accommodation space, with two ends being respectively connected to the first end portion and the second end portion; and the first end portion and the second end portion are exposed out of the first magnetic core.

5. The coupled magnetic element having high voltage resistance and high power density of claim 1, wherein the first coil is in insulated connection with the first magnetic core and the second coil, and the second coil is in insulated connection with the at least one second magnetic core.

6. The coupled magnetic element having high voltage resistance and high power density of claim 1, further comprising a plurality of spacer units, each of which is detachably disposed in a corresponding first gap, wherein the first inductor and the second inductor control an air gap between the first magnetic core and the at least one second magnetic core by means of arrangement of each spacer unit, so as to reach the required inductance magnitude.

7. The coupled magnetic element having high voltage resistance and high power density of claim 6, wherein each of the spacer units is made from a non-ferromagnetic material which comprises a mylar sheet, kraft paper sheet, plastic sheet, and glass sheet; or made by mixing different non-ferromagnetic materials.

8. The coupled magnetic element having high voltage resistance and high power density of claim 1, wherein there is a plurality of second magnetic cores, and a second gap is formed between two adjacent second magnetic cores; and the second inductor reaches the required inductance magnitude by virtue of an air gap formed by the second gap.

9. The coupled magnetic element having high voltage resistance and high power density of claim 1, wherein the first coil is U-shaped or Ω-shaped, and the second coil is C-shaped, and the at least one second magnetic core is inverted T-shaped.

10. The coupled magnetic element having high voltage resistance and high power density of claim 1, wherein the first magnetic core and the at least one second magnetic core are made from ferrite or a soft magnetic material, and the first coil and the second coil are flat coils.

* * * * *